United States Patent
McCloghrie et al.

(10) Patent No.: US 6,219,699 B1
(45) Date of Patent: Apr. 17, 2001

(54) MULTIPLE VLAN ARCHITECTURE SYSTEM

(75) Inventors: Keith McCloghrie, San Jose; Bernard R. James, Mountain View; Christopher Young, Boulder Creek; Norman W. Finn, San Jose, all of CA (US)

(73) Assignee: Cisco Technologies, Inc., San Jose, CA (US)

(*) Notice: Subject to any disclaimer, the term of this patent is extended or adjusted under 35 U.S.C. 154(b) by 0 days.

(21) Appl. No.: 09/277,329

(22) Filed: Mar. 26, 1999

Related U.S. Application Data (63) Continuation of application No. 08/582,074, filed on Jan. 2, 1996, now Pat. No. 6,035,105.

(51) Int. Cl.[7] .............................. G06F 13/40; H04L 12/28
(52) U.S. Cl. ........................ 709/221; 709/226; 370/392; 370/351
(58) Field of Search .................................... 370/396, 250, 370/230, 254, 392, 420, 351, 356, 452; 380/50; 365/49; 710/10; 709/218, 231, 272, 220, 221, 226; 714/4

(56) References Cited

U.S. PATENT DOCUMENTS

| Re. 33,900 | 4/1992 | Howson . |
|---|---|---|
| 4,131,767 | 12/1978 | Weinstein . |
| 4,161,719 | 7/1979 | Parikh et al. . |

(List continued on next page.)

FOREIGN PATENT DOCUMENTS

| 0 384 758 A2 | 8/1990 | (EP) . |
|---|---|---|
| 0 431 751 A1 | 6/1991 | (EP) . |
| 0 567 217 A2 | 10/1993 | (EP) . |
| WO93/07569 | 4/1993 | (WO) . |
| WO93/07692 | 4/1993 | (WO) . |
| WO94/01828 | 1/1994 | (WO) . |
| WO95/20850 | 8/1995 | (WO) . |

(List continued on next page.)

OTHER PUBLICATIONS

William Stallings, Data and Computer Communications, PP: 329–333, Prentice Hall, Upper Saddle River, New Jersey 07458.

Allen, M., "Novell IPX Over Various WAN Media (IPXW AN)," Network Working Group, RFC 1551, Dec. 1993, pp. 1–22.

Becker, D., "3c589.c: A 3c589 EtherLink3 ethernet driver for linux," becker@CESDIS.gsfc.nasa.gov, May 3, 1994, pp. 1–13.

(List continued on next page.)

Primary Examiner—Daniel H. Pan
(74) Attorney, Agent, or Firm—Cesari and McKenna, LLP (57) ABSTRACT

A system in which a single VLAN architecture spans multiple VLAN transport protocols and technologies, including a method and system in which multiple different VLANs may be combined in a single enterprise network. Each LAN-switch in the system identifies each frame with an identifier, and associates that identifier with particular VLAN identifiers for each type of VLAN technology. When a frame is bridged or routed from a first type of VLAN to a second type of VLAN, the first VLAN encapsulation is removed and the second VLAN encapsulation is added, with appropriate change in the VLAN identifier for the frame or packet. The identifier may also be implicit for the frame, such as when a particular set of sender's MAC addresses are identified with a particular VLAN. Individual VLANs, of whatever architecture, may be added, configured or reconfigured, modified, or deleted, using control tools associated with the multiple VLAN architecture system. Individual ports may be associated with particular VLANS, or may be designated "dynamic" so that frames or packets associated with those ports are associated with particular VLANs in response to source or destination addresses or other information.

20 Claims, 4 Drawing Sheets

U.S. PATENT DOCUMENTS

| | | |
|---|---|---|
| 4,316,284 | 2/1982 | Howson . |
| 4,397,020 | 8/1983 | Howson . |
| 4,419,728 | 12/1983 | Larson . |
| 4,424,565 | 1/1984 | Larson . |
| 4,437,087 | 3/1984 | Petr . |
| 4,438,511 | 3/1984 | Baran . |
| 4,439,763 | 3/1984 | Limb . |
| 4,445,213 | 4/1984 | Baugh et al. . |
| 4,446,555 | 5/1984 | Devault et al. . |
| 4,456,957 | 6/1984 | Schieltz . |
| 4,464,658 | 8/1984 | Thelen . |
| 4,499,576 | 2/1985 | Fraser . |
| 4,506,358 | 3/1985 | Montgomery . |
| 4,507,760 | 3/1985 | Fraser . |
| 4,532,626 | 7/1985 | Flores et al. . |
| 4,644,532 | 2/1987 | George et al. . |
| 4,646,287 | 2/1987 | Larson et al. . |
| 4,677,423 | 6/1987 | Benvenuto et al. . |
| 4,679,189 | 7/1987 | Olson et al. . |
| 4,679,227 | 7/1987 | Hughes-Hartogs . |
| 4,723,267 | 2/1988 | Jones et al. . |
| 4,731,816 | 3/1988 | Hughes-Hartogs . |
| 4,750,136 | 6/1988 | Arpin et al. . |
| 4,757,495 | 7/1988 | Decker et al. . |
| 4,763,191 | 8/1988 | Gordon et al. . |
| 4,769,810 | 9/1988 | Eckberg, Jr. et al. . |
| 4,769,811 | 9/1988 | Eckberg, Jr. et al. . |
| 4,771,425 | 9/1988 | Baran et al. . |
| 4,819,228 | 4/1989 | Baran et al. . |
| 4,827,411 | 5/1989 | Arrowood et al. . |
| 4,833,706 | 5/1989 | Hughes-Hartogs . |
| 4,835,737 | 5/1989 | Herrig et al. . |
| 4,879,551 | 11/1989 | Georgiou et al. . |
| 4,893,306 | 1/1990 | Chao et al. . |
| 4,903,261 | 2/1990 | Baran et al. . |
| 4,922,486 | 5/1990 | Lidinsky et al. . |
| 4,933,937 | 6/1990 | Konishi . |
| 4,960,310 | 10/1990 | Cushing . |
| 4,962,497 | 10/1990 | Ferenc et al. . |
| 4,962,532 | 10/1990 | Kasirai et al. . |
| 4,965,767 * | 10/1990 | Kinoshita et al. ................ 365/49 |
| 4,965,772 | 10/1990 | Daniel et al. . |
| 4,970,678 | 11/1990 | Sladowski et al. . |
| 4,979,118 | 12/1990 | Kheradpir ............................ 364/436 |
| 4,980,897 | 12/1990 | Decker et al. . |
| 4,991,169 | 2/1991 | Davis et al. . |
| 5,003,595 | 3/1991 | Collins et al. . |
| 5,014,265 | 5/1991 | Hahne et al. . |
| 5,020,058 | 5/1991 | Holden et al. . |
| 5,033,076 | 7/1991 | Jones et al. . |
| 5,034,919 * | 7/1991 | Sasai et al. ............................ 365/49 |
| 5,054,034 | 10/1991 | Hughes-Hartogs . |
| 5,059,925 | 10/1991 | Weisbloom . |
| 5,072,449 | 12/1991 | Enns et al. . |
| 5,088,032 | 2/1992 | Bosack . |
| 5,095,480 | 3/1992 | Fenner . |
| 5,115,431 | 5/1992 | Williams et al. . |
| 5,128,945 | 7/1992 | Enns et al. . |
| 5,136,580 | 8/1992 | Videlock et al. . |
| 5,166,930 | 11/1992 | Braff et al. . |
| 5,199,049 | 3/1993 | Wilson . |
| 5,206,886 | 4/1993 | Bingham . |
| 5,208,811 | 5/1993 | Kashio et al. . |
| 5,212,686 | 5/1993 | Joy et al. . |
| 5,224,099 | 6/1993 | Corbalis et al. . |
| 5,226,120 | 7/1993 | Brown et al. . |
| 5,228,062 | 7/1993 | Bingham . |
| 5,229,994 | 7/1993 | Balzano et al. . |
| 5,237,564 | 8/1993 | Lespagnol et al. . |
| 5,241,682 | 8/1993 | Bryant et al. . |
| 5,243,342 | 9/1993 | Kattemalalavadi et al. . |
| 5,243,596 | 9/1993 | Port et al. . |
| 5,247,516 | 9/1993 | Bernstein et al. . |
| 5,249,178 | 9/1993 | Kurano et al. . |
| 5,251,205 * | 10/1993 | Callon et al. ........................ 370/392 |
| 5,253,251 | 10/1993 | Aramaki . |
| 5,255,291 | 10/1993 | Holden et al. . |
| 5,260,933 | 11/1993 | Rouse . |
| 5,260,978 | 11/1993 | Fleischer et al. . |
| 5,268,592 | 12/1993 | Bellamy et al. . |
| 5,268,900 | 12/1993 | Hluchyj et al. . |
| 5,271,004 | 12/1993 | Proctor et al. . |
| 5,274,631 | 12/1993 | Bhardwaj . |
| 5,274,635 | 12/1993 | Rahman et al. . |
| 5,274,643 | 12/1993 | Fisk . |
| 5,280,470 | 1/1994 | Buhrke et al. . |
| 5,280,480 | 1/1994 | Pitt et al. . |
| 5,280,500 | 1/1994 | Mazzola et al. . |
| 5,283,783 | 2/1994 | Nguyen et al. . |
| 5,287,103 | 2/1994 | Kasprzyk et al. . |
| 5,287,453 | 2/1994 | Roberts . |
| 5,291,482 | 3/1994 | McHarg et al. . |
| 5,305,311 | 4/1994 | Lyles . |
| 5,307,343 | 4/1994 | Bostica et al. . |
| 5,309,437 | 5/1994 | Perlman et al. .................. 730/85.13 |
| 5,311,509 | 5/1994 | Heddes et al. . |
| 5,313,454 | 5/1994 | Bustini et al. . |
| 5,313,582 | 5/1994 | Hendel et al. . |
| 5,317,562 | 5/1994 | Nardin et al. . |
| 5,319,644 | 6/1994 | Liang . |
| 5,327,421 | 7/1994 | Hiller et al. . |
| 5,331,637 | 7/1994 | Francis et al. . |
| 5,345,445 | 9/1994 | Hiller et al. . |
| 5,345,446 | 9/1994 | Hiller et al. . |
| 5,359,592 | 10/1994 | Corbalis et al. . |
| 5,361,250 | 11/1994 | Nguyen et al. . |
| 5,361,256 | 11/1994 | Doeringer et al. . |
| 5,361,259 | 11/1994 | Hunt et al. . |
| 5,365,524 | 11/1994 | Hiller et al. . |
| 5,367,517 | 11/1994 | Cidon et al. . |
| 5,371,852 | 12/1994 | Attanasio et al. . |
| 5,386,567 | 1/1995 | Lien et al. . |
| 5,390,170 | 2/1995 | Sawant et al. . |
| 5,390,175 | 2/1995 | Hiller et al. . |
| 5,394,394 | 2/1995 | Crowther et al. . |
| 5,394,402 | 2/1995 | Ross . |
| 5,400,325 | 3/1995 | Chatwani et al. . |
| 5,408,469 | 4/1995 | Opher et al. . |
| 5,416,842 | 5/1995 | Aziz . |
| 5,422,880 | 6/1995 | Heitkamp et al. . |
| 5,422,882 | 6/1995 | Hiller et al. . |
| 5,423,002 | 6/1995 | Hart . |
| 5,426,636 | 6/1995 | Hiller et al. . |
| 5,428,607 | 6/1995 | Hiller et al. . |
| 5,430,715 | 7/1995 | Corbalis et al. . |
| 5,430,729 | 7/1995 | Rahnema . |
| 5,442,457 | 8/1995 | Najafi . |
| 5,442,630 | 8/1995 | Gagliardi et al. . |
| 5,452,297 | 9/1995 | Hiller et al. . |
| 5,473,599 | 12/1995 | Li et al. . |
| 5,473,607 | 12/1995 | Hausman et al. . |
| 5,477,541 * | 12/1995 | White et al. ........................ 370/392 |
| 5,485,455 | 1/1996 | Dobbins et al. . |
| 5,490,140 | 2/1996 | Abensour et al. . |
| 5,490,258 | 2/1996 | Fenner . |
| 5,491,687 | 2/1996 | Christensen et al. . |
| 5,491,804 | 2/1996 | Heath et al. . |
| 5,497,368 | 3/1996 | Reijnierse et al. . |
| 5,504,747 | 4/1996 | Sweasey . |
| 5,509,006 | 4/1996 | Wilford et al. . |
| 5,517,494 | 5/1996 | Green . |

| | | |
|---|---|---|
| 5,519,704 | 5/1996 | Farinacci et al. . |
| 5,519,858 | 5/1996 | Walton et al. ................ 395/600 |
| 5,526,489 | 6/1996 | Nilakantan et al. . |
| 5,530,963 | 6/1996 | Moore et al. . |
| 5,535,195 | 7/1996 | Lee . |
| 5,539,734 | 7/1996 | Burwell et al. . |
| 5,541,911 | 7/1996 | Nilakantan et al. . |
| 5,546,370 | 8/1996 | Ishikawa . |
| 5,555,244 | 9/1996 | Gupta et al. . |
| 5,561,669 | 10/1996 | Lenney et al. . |
| 5,583,862 | 12/1996 | Callon . |
| 5,592,470 | 1/1997 | Rudrapatna et al. . |
| 5,598,581 | 1/1997 | Daines et al. . |
| 5,600,798 | 2/1997 | Chenrukuri et al. . |
| 5,602,770 * | 2/1997 | Ohira ................ 365/49 |
| 5,604,868 | 2/1997 | Komine et al. . |
| 5,608,726 | 3/1997 | Virgile . |
| 5,617,417 | 4/1997 | Sathe et al. . |
| 5,617,421 | 4/1997 | Chin et al. . |
| 5,630,125 | 5/1997 | Zellweger . |
| 5,631,908 | 5/1997 | Saxe . |
| 5,632,021 | 5/1997 | Jennings et al. . |
| 5,633,869 * | 5/1997 | Burnett et al. ................ 370/396 |
| 5,634,010 | 5/1997 | Ciscon et al. . |
| 5,638,359 | 6/1997 | Peltola et al. . |
| 5,644,718 | 7/1997 | Belove et al. . |
| 5,659,684 | 8/1997 | Giovannoni et al. . |
| 5,666,353 | 9/1997 | Klausmeier et al. . |
| 5,673,265 | 9/1997 | Gupta et al. . |
| 5,678,006 | 10/1997 | Valizadeh et al. . |
| 5,680,116 | 10/1997 | Hashimoto et al. . |
| 5,684,797 | 11/1997 | Aznar et al. . |
| 5,687,324 | 11/1997 | Green et al. . |
| 5,689,506 | 11/1997 | Chiussi et al. . |
| 5,694,390 | 12/1997 | Yamato et al. . |
| 5,724,351 | 3/1998 | Chao et al. . |
| 5,740,097 * | 4/1998 | Satoh ................ 365/49 |
| 5,748,186 | 5/1998 | Raman . |
| 5,748,617 | 5/1998 | McLain, Jr. . |
| 5,754,547 | 5/1998 | Nakazawa . |
| 5,802,054 | 9/1998 | Bellenger . |
| 5,835,710 * | 11/1998 | Nagami et al. ................ 709/250 |
| 5,841,874 * | 11/1998 | Kempke et al. ................ 380/50 |
| 5,854,903 | 12/1998 | Morrison et al. . |
| 5,856,981 | 1/1999 | Voelker . |
| 5,859,837 * | 1/1999 | Crayford ................ 370/230 |
| 5,892,924 | 4/1999 | Lyon et al. ................ 395/200.75 |
| 5,898,686 | 4/1999 | Virgile . |
| 5,903,559 | 5/1999 | Acharya et al. . |

OTHER PUBLICATIONS

Chowdhury, et al., "Alternative Bandwidth Allocation Algorithms for Packet Video in ATM Networks," INFOCOM 1992, pp. 1061–1068.

Doeringer, W., "Routing on Longest–Matching Prefixes," IEEE/ACM Transactions in Networking, vol. 4, No. 1, Feb. 1996, pp. 86–97.

Esaki, et al., "Datagram Delivery in an ATM–Internet," 2334b IEICE Transactions on Communications, Mar. 1994, No. 3, Tokyo, Japan.

IBM Corporation, "Method and Apparatus for the Statistical Multiplexing of Voice, Data and Image Signals," IBM Technical Disclosure Bulletin, No. 6, Nov. 1992, pp. 409–411.

Pei, et al., "Putting Routing Tables in Silicon," IEEE Network Magazine, Jan. 1992, pp. 42–50.

Perkins, D., "Requirements for an Internet Standard Point–to–Point Protocol," Network Working Group, RFC 1547, Dec. 1993, pp. 1–19.

Simpson, W., "The Point–to–Point Protocol (PPP)," Network Working Group, RFC 1548, Dec. 1993, pp. 1–53.

Tsuchiya, P.F., "A Search Algorithm for Table Entries with Non–Contiguous Wildcarding," Abstract, Bellcore.

Zhang, et al., "Rate–Controlled Static–Priority Queueing," INFOCOM 1993, pp. 227–236.

* cited by examiner

MULTIPLE VLAN ARCHITECTURE SYSTEM

This is a continuation of application Ser. No. 08/582,074 filed Jan. 2, 1996 now U.S. Pat. No. 6,035,105.

BACKGROUND OF THE INVENTION

1. Field of the Invention

This invention relates to a multiple VLAN architecture system.

2. Description of Related Art

When interconnecting computers and other devices in a network, it has become desirable to create "virtual local area networks" (VLANs), in which all devices coupled to a VLAN receive all frames or packets which are universally addressed (whether by broadcast, multicast, or some other technique) on that VLAN, and in which all frames or packets which are universally addressed by a device on a VLAN are not distributed to devices outside the VLAN. However, there is more than one type of VLAN transport protocol technology which has been proposed and come to be accepted in the art. For example, VLAN technologies which are now common include LANE (for ATM LAN-Emulation), IEEE Standard 802.10, and various proprietary schemes such as ISL (for cisco Catalyst™ Inter-Switch Links).

One problem which has arisen in the art is that it is desirable to couple devices on a single VLAN even though those devices have been designed or configured for different VLAN transport protocols or technologies. Aspects of this problem are that it is desirable for devices to be on the same VLAN even though they are not physically proximal to each other or cannot be coupled to the same switching device (for example, due to limitations imposed by respective media speed), that it is desirable for devices (or networks comprising those devices) to be configurable so that a device may be moved from one VLAN to another VLAN with ease, and that it is desirable for a device to be coupled to different VLANs at different times or to multiple VLANs at one time.

Accordingly, it would be advantageous to provide a multiple VLAN architecture system, such as one which is capable of operating in a network environment with multiple different VLANs, and multiple different VLAN technologies.

The following U.S. patent(s) may be pertinent:

U.S. Pat. No. 5,394,402, issued Feb. 28, 1995, in the name of Floyd E. Ross, titled "Hub For Segmented Virtual Local Area Network With Shared Media Access".

This patent discloses a hub for a segmented VLAN system. The hub receives packets from one of the devices, called "end stations" which are coupled thereto, and forwards them using a backbone network to other such hubs, for forwarding to other devices coupled to the same VLAN. Essentially, the hub serves to bridge packets among its ports such that packets are bridged only to those other devices which are on the same VLAN.

The pertinence of the related art will also be apparent to those skilled in the art after perusal of this application.

SUMMARY OF THE INVENTION

The invention provides a system in which a single VLAN architecture spans multiple VLAN transport protocols and technologies, including a method and system in which each VLAN may span multiple different VLAN technologies. Each LAN-switch in the system identifies each frame with an identifier, and associates that identifier with particular VLAN identifiers for each type of VLAN architecture. When a frame is bridged or routed from a first type of VLAN to a second type of VLAN, the first VLAN encapsulation is removed and the second VLAN encapsulation is added, with appropriate change in the VLAN identifier for the frame or packet. The identifier may also be implicit for the frame, such as when a particular set of sender's MAC addresses are identified with a particular VLAN.

In a preferred embodiment, individual VLANs, which may span the set of multiple VLAN technologies, may be added, configured or reconfigured, modified, or deleted, using control tools associated with the multiple VLAN architecture system. Individual ports may be associated with particular VLANs, or may be designated "dynamic" so that frames or packets associated with those ports are associated with particular VLANs in response to source or destination addresses or other information.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

MULTIPLE VLAN ARCHITECTURE SYSTEM

Figure 1:
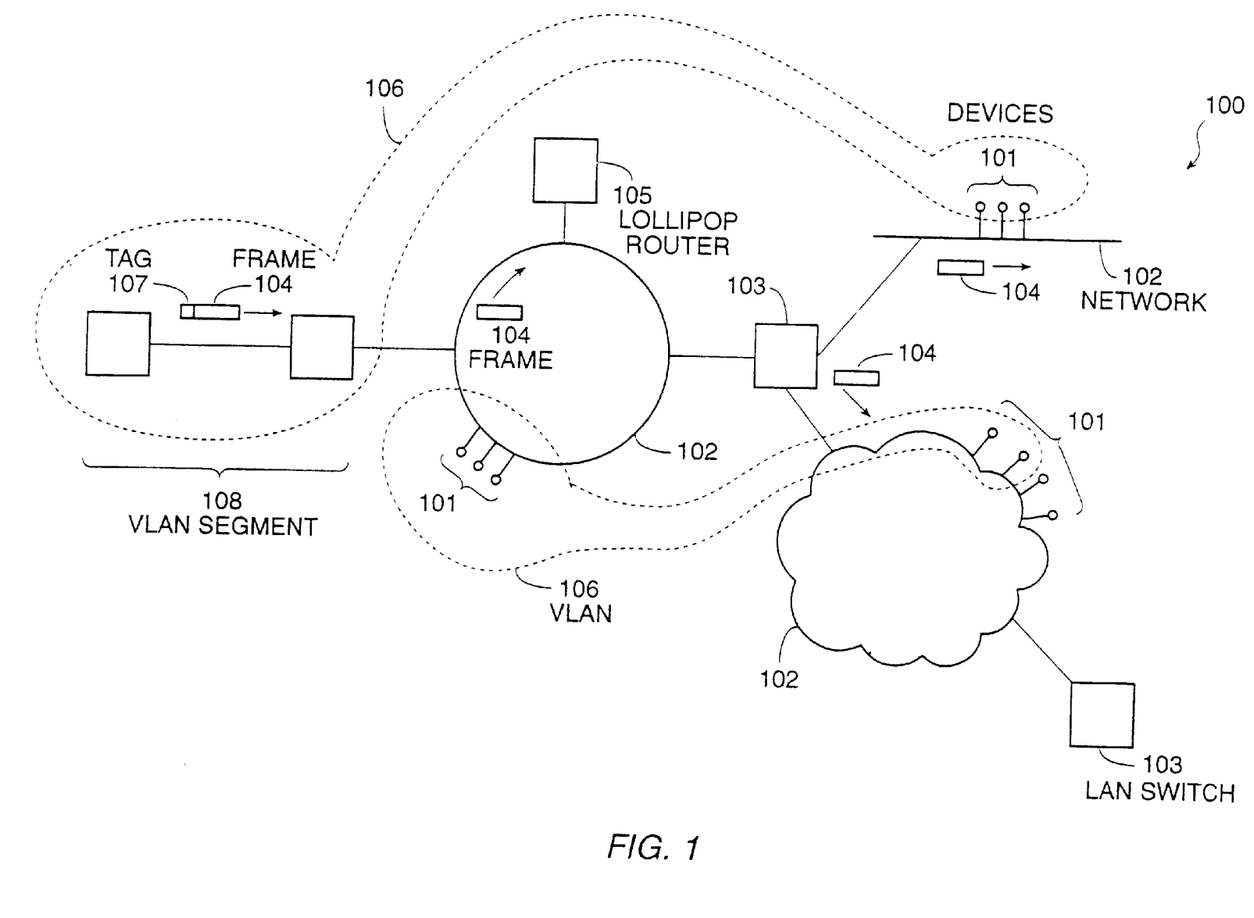
FIG. 1 is a diagram of a network having multiple VLANs.

FIG. 1 is a diagram of a network having multiple VLANs.

In an interconnected network 100, a set of devices 101 may be coupled to a plurality of physical networks 102. Each network 102 may comprise a local area network (LAN) such as an ethernet LAN, a token ring LAN, an FDDI network, or another LAN architecture. Each network 102 may transmit a set of frames 104 using one of a plurality of media access transmit protocols. Architectures for local area networks and for their media access transmit protocols are known in the art of networking.

The networks 102 are coupled using a set of LAN-switches 103. The LAN-switches 103 forward frames (using a level two protocol) or packets (using a level three protocol) among the networks 102. Each LAN-switch 103 is coupled to one or more networks 102. For example, one of the LAN-switches 103 may be coupled to two or more networks 102. LAN-switches are known in the art of networking.

The devices 101 are associated with a plurality of different VLAN technologies, and therefore may transmit frames using one of a plurality of VLAN transmit protocols. For example, each device 101 may be associated with a VLAN transmit protocol such as ATM LAN Emulation (LANE), IEEE 802.10, cisco Catalyst™ Inter-Switch Links (ISLs), or another VLAN transmit protocol. Each device 101 may be associated with just one VLAN technology, or with a plurality of VLAN technologies.

The devices 101 are assigned to a plurality of VLANs 106, independent of their associated VLAN technologies. Each VLAN 106 need not comprise a single or homogeneous VLAN technology; moreover, each VLAN 106 is not subject to any requirement that all devices 101 on that VLAN 106 are proximate or even coupled using the same LAN or VLAN technology.

Those frames 104 to be transmitted on a particular VLAN segment 108 are identified with a tag 107 referencing that particular VLAN 106. As the frame 104 is forwarded between differing VLAN technologies, the tag 107 uses a tagging technique particular to that VLAN technology. For example, the tag 107 for the same VLAN 106 may be the character string 'GR" for LANE, the numeric value '1024' for IEEE 802.10, or the numeric value '10' for ISL.

The LAN-switches 103 are configured to (1) receive frames from a first VLAN associated with a first VLAN transmit protocol and encapsulated using a multiple-VLAN transmit protocol, (2) to remove the encapsulation, (3) to re-encapsulate the frames with a second VLAN transmit protocol, and (4) to transmit: the re-encapsulated frames onto a second VLAN.

In alternative embodiments, the frames 104 may have implicit tagging. In this case, those frames 104 which are addressed from a first particular set of MAC addresses (or are otherwise identifiable from their frame headers) are designated as being for a first VLAN segment 108, while those frames 104 which are addressed from a second particular set of MAC addresses are designated as being for a second VLAN segment 108.

As described herein, the LAN-switches 103 may also include the capability to perform layer-3 routing. LAN-switches 103 which include such layer-3 routing may couple a set of frames 104 between virtual LANs (VLANs) as well as physical networks 102, it is possible for such a LAN-switch 103 to be coupled to only a single network 102, and to route the frames 104 found on that network 102 between different VLANs. In that circumstance, the LAN-switch 103 receives the frame 104 from one of the VLANs implemented by the network 102, and transmits the frame 104 onto another one of the VLANs implemented by the network 102. An example of one such LAN-switch 103, sometimes called a "lollypop router" 105, is shown in the figure.

FORWARDING FRAMES AMONG MULTIPLE VLANS

Figure 2:
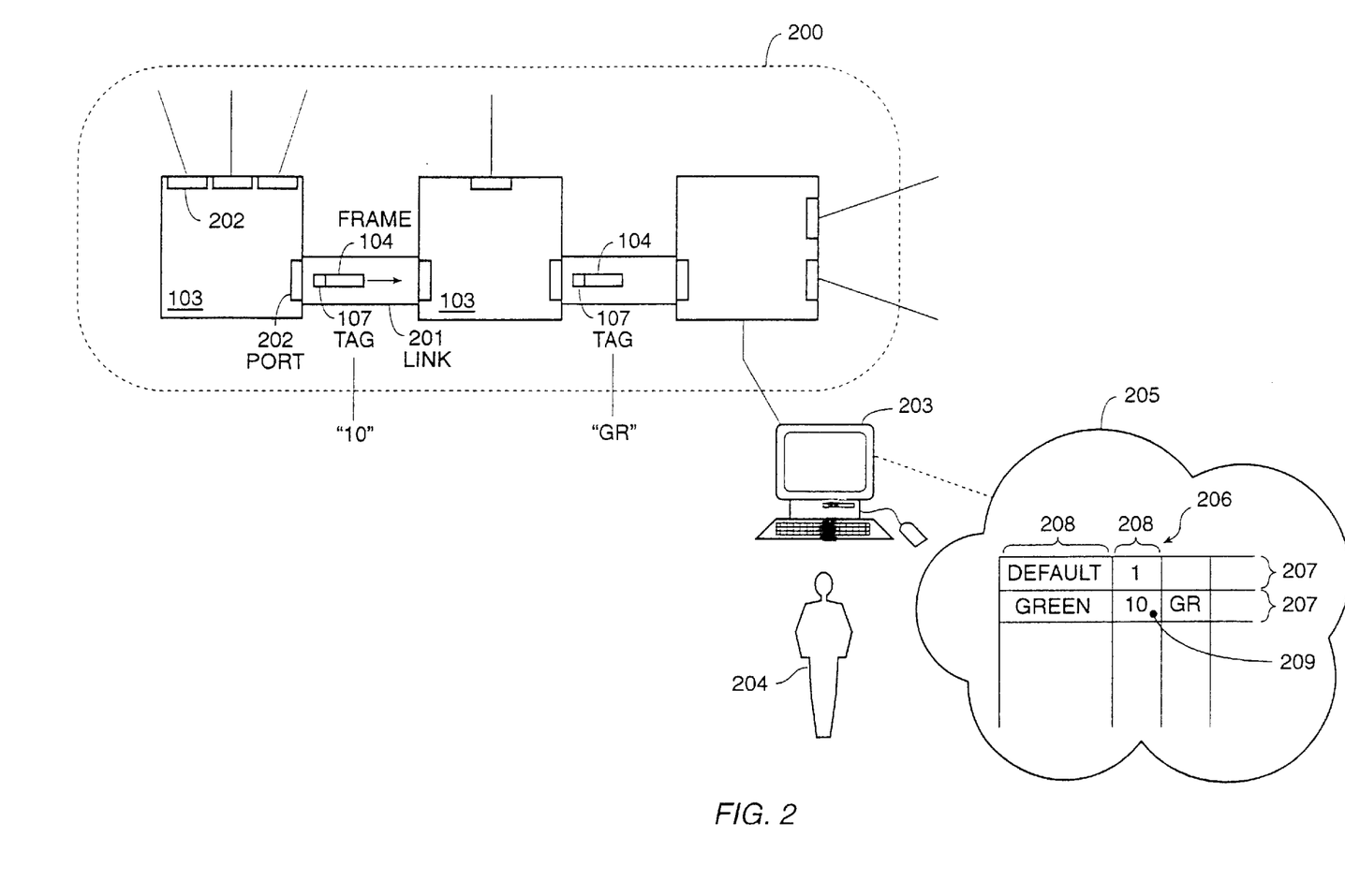
FIG. 2 is a diagram of a set of LAN-switches disposed for coupling messages between multiple VLANs.

FIG. 2 is a diagram of a set of LAN-switches disposed for coupling messages between multiple VLANs.

The set of LAN-switches 103 collectively comprises a subnet 200, in which pairs of the LAN-switches 103 are coupled by a set of links 201. Each link 201 comprises a physical network 102, so that a set of frames 104 may be coupled between pairs of LAN-switches 103. Each LAN-switch 103 comprises a set of ports 202 coupling the LAN-switch 103 to one of its links 201, and therefore to another LAN-switch 103.

Each LAN-switch 103 receives packets at each of its ports 202, and recognizes each VLAN 106 which might be received at port 202. When a frame 104 must be forwarded from a first VLAN segment 108 to a second VLAN segment 108, the LAN-switch 103 removes tags 107 (shown in the figure as the numeric value '10') for a first VLAN segment 108 and replaces them with tags 107 (shown in the figure as the character string value 'GR') for a second VLAN segment 108.

In a preferred embodiment, the LAN-switch 103 identifies the second VLAN segment 108 required for the destination device 101 responsive to the output port 202 to which the frame 104 is routed. The port 202 may be one of three types shown in table 2-1.

TABLE 2-1

| Port Type | Treatment |
| --- | --- |
| static | Each frame from the port is for a particular VLAN which is statically configured for that port, regardless of the address or content of that frame. |
| dynamic | The port may be assigned to one of a plurality of VLANs, one at a time. Each frame to or from the port is examined and the port is dynamically reassigned to a different VLAN in response to the address or content of that frame.<br>(For example, the port may be dynamically reassigned in response to the MAC address of the sending device, or in response to a layer three address.) |
| trunk | The port is assigned to a plurality of VLAN at once Each frame to or from the port uses an encapsulation or related technique to tag that frame as for a particular VLAN.<br>A VLAN trunk protocol causes each LAN-switch to transmit advertisements regarding, and acquire information about, VLANs for which that trunk port is configured. Thus, a new VLAN need only be configured for one LAN-switch in a management domain, as the VLAN trunk protocol will ultimately propagate that information to all LAN-switches in the management domain. The VLAN trunk protocol is described in further detail below. |

When the LAN-switch 103 receives a frame 104 on a static port 202, it knows that frame 104 must be for the VLAN 106 statically configured for that port 202. When the LAN-switch 103 transmits that frame 104 on another port 202 which is a trunk port 202, it must encapsulate the frame 104 with the appropriate outgoing tag 107 to indicate the VLAN 106.

When the LAN-switch 103 receives a frame 104 on a dynamic port 202, it knows that the frame 104 must be configured according to one of the plurality of VLANs 106 configured for that port 202, responsive to the address or contents (preferably the MAC address) of that frame 104. The LAN-switch 103 identifies the incoming VLAN 106 responsive to the MAC address of the frame 104. When the LAN-switch 103 transmits that frame 104 on another port 202 which is a trunk port 202, it must encapsulate the frame 104 with the appropriate outgoing tag 107 to indicate the VLAN 106.

When the LAN-switch 103 receives a frame 104 on a trunk port 202, it knows that the frame 104 must be encapsulated and that the encapsulated frame may be for one of a plurality of VLANs 106. The LAN-switch 103 identifies the VLAN 106 for the frame 104 responsive to the encapsulation header, and removes the encapsulation. When the LAN-switch 103 transmits that frame 104 on another trunk port 202, it must re-encapsulate that frame 104.

An network administrative workstation 203 is coupled to one LAN-switch 103 or elsewhere, and comprises a processor, program and data memory and mass storage, for executing application programs and for recording information, at least one input device (such as a keyboard or a pointing device such as a mouse) for receiving information from an operator 204, and at least one output device (such as a monitor or printer) for presenting information to the operator 204.

To identify the outgoing tag 107 which corresponds to the incoming tag 107, the LAN-switch 103 maintains a database 205 which is preferably also available at the network administrative workstation 203. The database 205 comprises a table 206; the table 206 comprises a set of rows 207 and a set of columns 208, with an entry 209 at the intersection of each row 207 and each column 208. The table 206 is indexed by a column 208 for a VLAN management ID; there is one row 207 for each VLAN 106 and one column 208 for each VLAN transmit protocol.

In a preferred embodiment, the VLAN management ID comprises a character string, such as "red" or "green". One VLAN management ID, "default", is reserved for an initial VLAN 106. LAN-switches 103 are configured for the "default" VLAN 106 when they are shipped from the factory. In a preferred embodiment, the VLAN management ID comprises an ASCII character string of eight characters or less.

In a preferred embodiment, the table 206 comprises is one column 208 for LANE, one column 208 for IEEE 802.10, and one column 208 for ISL. Each entry 209 comprises a tag 107 for the VLAN corresponding to its row 207 and the VLAN transmit protocol corresponding to its column 208. The data for each entry 209 has a data type which depends on the particular VLAN technology, such as numeric data, ASCII character data, or other data.

In a preferred embodiment, the ISL tag 107 for the "default" VLAN 106 is '1'. For IEEE 802.10, frames 104 for the "default" VLAN 106 may be transmitted as native frames without IEEE 802.10 encapsulation.

In a preferred embodiment, the database 205 also comprises information regarding properties associated with each VLAN 106 (such as, for example, whether the VLAN 106 has had its operation suspended).

In alternative embodiments, the database 205 may be made available at other locations. For example, the database 205 may be recorded and updated separately at each LAN-switch 103, at a particular LAN-switch 103, or at a particular non-routing device 101.

MANAGEMENT DOMAINS AND NETWORK ADMINISTRATION

Figure 3:
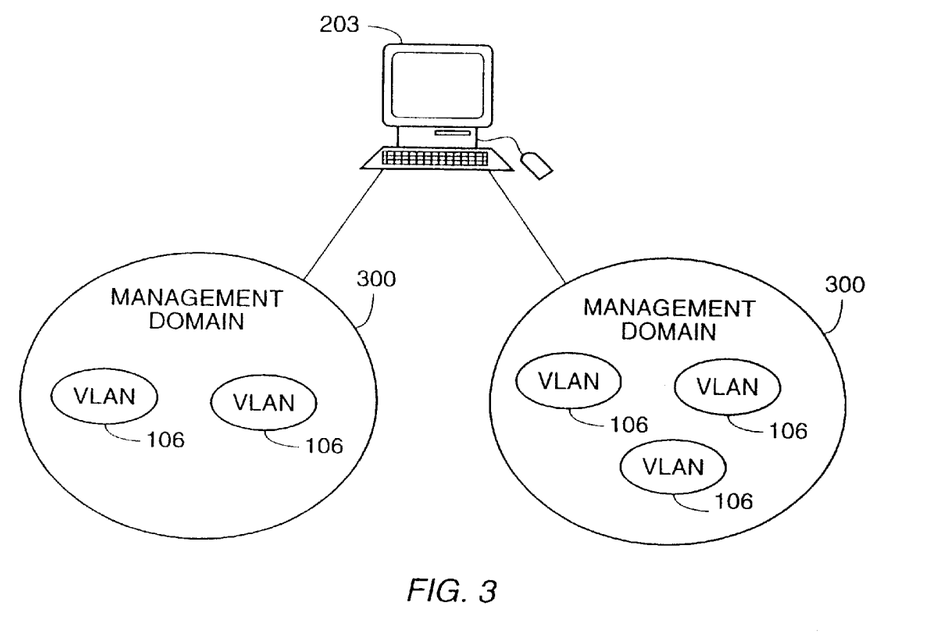
FIG. 3 is a diagram showing a relationship between multiple VLANs, management domains, and network administration.

FIG. 3 is a diagram showing a relationship between multiple VLANs, management domains, and network administration.

The network administrative workstation 203 controls a set of management domains 300, each of which comprises one or more VLANs 106. Each VLAN 106 comprises one or more devices 101 on one or more networks 102 in the interconnected network 100.

Each VLAN 106 must have a unique name within its management domain 300.

When two management domains 300 are coupled via a trunk port 202, the default behavior (prior to any additional configuration) is that no frames 104 are forwarded between the two management domains 300. However, the respective ports 202 may he configured using the network administrative workstation 203 to forward frames 104 for specific VLANs 106.

When two management domains 300 are coupled via a non-trunk port 202 (thus, via a static port 202 or a dynamic port 202), the respective ports 202 may be configured using the network administrative workstation 203 to forward frames 104 for specific VLANs 106.

When frames 104 are transmitted across a trunk port 202 between a first management domain 300 and a second management domain 300, the LAN-switch 103 must have a mapping between the source VLAN 106 in the first management domain 300 and the destination VLAN 106 in the second management domain 300.

Each LAN-switch 103 maintains a list of VLANs 106 which are valid in its management domain 300. This list is associated at each LAN-switch 103 with a configuration revision number; the configuration revision number is updated whenever a change is made to the configuration for that management domain 300. Thus, a LAN-switch 103 can compare its configuration revision number with the new configuration to determine which is more recent.

When they are initially shipped from the factory, LAN-switches 103 are configured in a "no-management-domain" state. In this state the LAN-switch 103 does not belong to any particular management domain 300 and will update its database to learn about new VLANs 106 from all VLAN trunk protocol advertisements it receives. When a LAN-switch 103 is configured for a particular management domain 300, it will ignore advertisements from different management domains 300 and it will check advertisements from the same management domain 300 for consistency.

When a LAN-switch 103 learns about a VLAN 106, it will have received frames 104 from that VLAN 106 on any trunk port 202, and will forward those frames 104 to all of its other trunk ports 202 (if any). This behavior may be altered by reconfiguring the LAN-switch 103 using the network administration workstation 203 to disable one or more VLANs 106 for a particular trunk port 202.

MULTIPLE VLAN NETWORK ADMINISTRATION

The operator 204 at the network administrative workstation 203 may alter the database 205 and cause those alterations to be propagated to the LAN-switches 103. Table 3-1 shows the changes which the operator 204 at the network administrative workstation 203 may make.

TABLE 3-1

| Change | Effect |
| --- | --- |
| create a VLAN | A new VLAN is created. A record is created for the new VLAN; a new VLAN management ID is created; entries are made for the new VLAN for each VLAN technology |
| delete a VLAN | An existing VLAN is removed from the configuration for the management domain. The deleted VLAN's entries in the database at the network administration workstation are purged and any ports configured for the deleted VLAN are automatically disabled. In an alternative embodiment, the deleted VLAN is only purged from the database after all ports configured for the deleted VLAN are reconfigured for another VLAN. The "default" VLAN cannot be deleted. |
| suspend a VLAN | An existing VLAN has its operation suspended. All traffic for the suspended VLAN is turned off for the duration of the suspension. (This function might be useful, for example, if traffic for the suspended VLAN was disrupting the network.) All ports configured for the suspended VLAN are disabled for the duration of the suspension. The "default" VLAN cannot be suspended. |
| resume a VLAN | A suspended VLAN has its suspension terminated. All ports for the resumed VLAN are re-enabled and traffic is allowed to flow for the resumed VLAN. |

Those skilled in the art will recognize, after perusal of this application, that other and further management functions would not require undue experimentation, and are within the scope and spirit of the invention.

VLAN PROTOCOLS AND MESSAGE FORMATS

Figure 4:
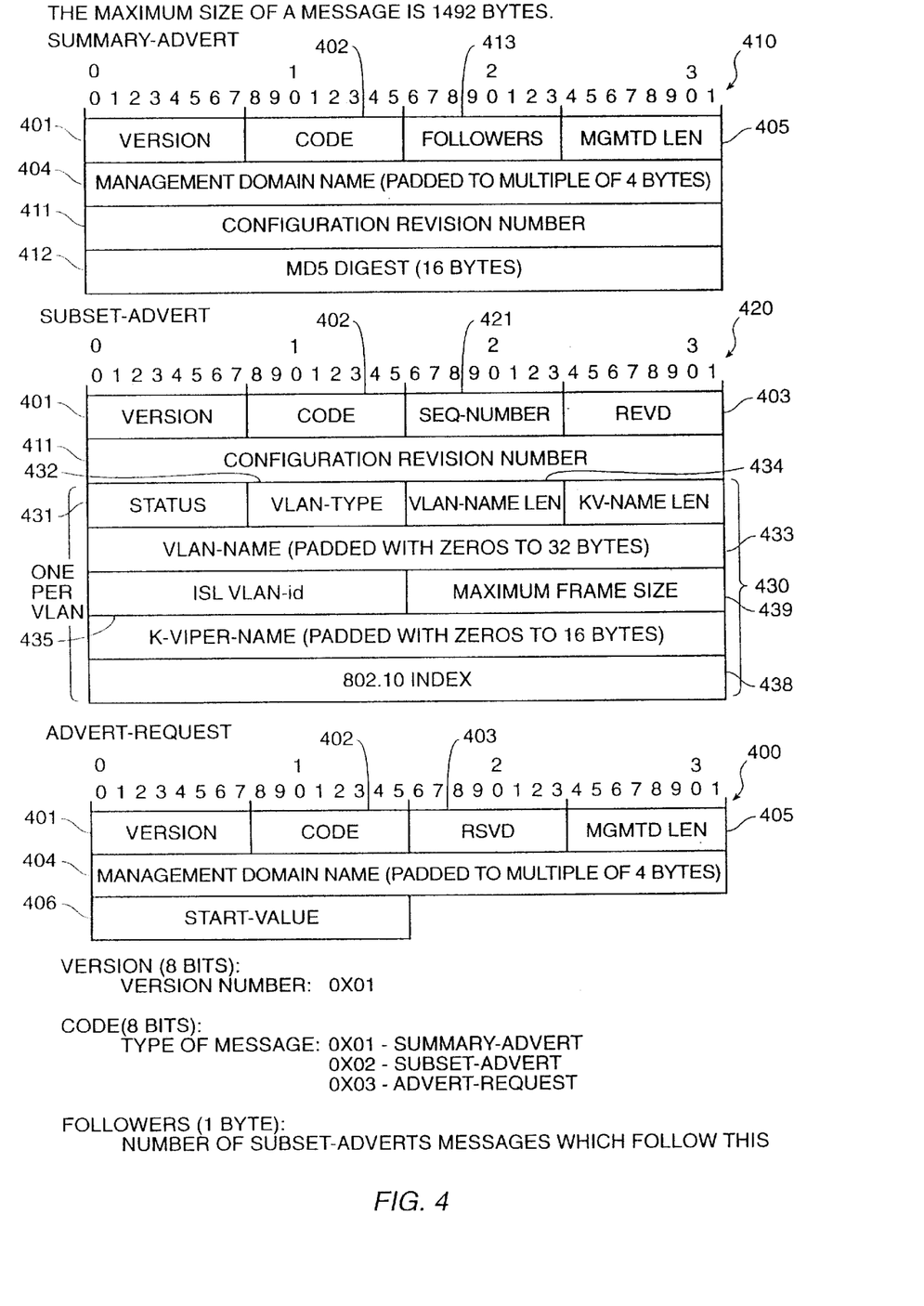
FIG. 4 is a diagram showing message formats for use in a VLAN protocol.

FIG. 4 is a diagram showing message formats for use in VLAN protocols.

VLAN Trunk Protocol

Each LAN-switch 103 transmits advertisements regarding all VLANs 106 about which it knows, and possibly other information global to the management domain 300. Advertisements are transmitted via the "default" VLAN 106; thus, only one advertisement is transmitted for each trunk port 202. Advertisements are transmitted as multicast frames 104 but not forwarded using normal bridging techniques.

Each LAN-switch 103 maintains a configuration revision number for each managment domain 300 for which it is configured. The configuration revision number is an unsigned 32 bit value, which is initially set to zero and is incremented by one for each modification or reconfiguration at the LAN-switch 103 until the maximum value of 4,294,967,295 (hexadecimal 'FFFF FFFF') is reached, at which point the configuration revision number is wrapped around back to zero.

When a LAN-switch 103 receives an advertisement and it is not configured for any management domain 300, it updates its database 205 from that advertisement. When a LAN-switch 103 receives an advertisement and it is configured for one or more particular management domains 300, it authenticates that advertisement using its current configuration revision number for the appropriate management domain 300. If the advertisement is authentic and its configuration revision number exceeds the LAN-switch's current configuration revision number, the LAN-switch 103 updates its database 205 from that advertisement; otherwise the LAN-switch 103 ignores the advertisement.

The configuration revision number A is deemed to be less than the configuration revision number B if and only if ((A<B and (B−A)<2,147,483,648) or (A>B and (A−B)>2,147,483,648))

The types of advertisement messages are shown in table 4-1.

TABLE 4-1

| Port Type | Treatment |
|---|---|
| Advert-Request | This message requests that an advertisement be sent. |
| Summary-Advert | This message provides the management domain, configuration revision number, and checksum for the advertisement. The Summary-Advert message is followed by zero or more Subset-Advert messages, as appropriate. |
| Subset-Advert | This message comprises all advertised information for one or more VLANs. Each Subset-Advert message is labelled with a sequence number in case more than one Subset-Advert message is sent. |

The Advert-Request message 400 comprises a VLAN trunk protocol version number 401 (1 byte, which is always '1'), a type of message code 402 (1 byte, which is preferably '3' for the Advert-Request message 400), a reserved byte 403, a management domain name 404 (variable length, but preferably a multiple of 4 bytes), a length value 405 (1 byte) for the management domain name 404, and a start value 406 (2 bytes).

The Summary-Advert message 410 comprises the VLAN trunk protocol version number 401, the type of message code 402 (which is preferably '1' for the Summary-Advert message 410), the management domain name 404 (variable length, but preferably a multiple of 4 bytes), a length value 405 (1 byte) for the management domain name 404, a configuration revision number 411 (4 bytes), an MD5 digest value 412 (4 bytes), and a followers value 413 (1 byte).

The Subset-Advert message 420 comprises the VLAN trunk protocol version number 401, the type of message code 402 (which is preferably '2' for the Subset-Advert message 420), a reserved byte 403, the configuration revision number 411, a sequence number 421 (1 byte), and a sequence of VLAN blocks 430.

Each VLAN block 430 comprises a status value 431 (1 byte), a VLAN type value 432 (1 byte), a VLAN name 433 (variable length, but preferably a multiple of 4 bytes), a length value 434 (1 byte) for the VLAN name 433, an ISL VLAN identifier 435 (2 bytes), an IEEE 802.10 index value 438, and a maximum frame size value 439.

The start value 406 is used in the event that the LAN-switch 103 does not desire all VLANs 106 to be advertised to it. In the actual advertisement, the Subset-Advert messages 420 are ordered by ISL VLAN identifier 435. The start value 406 indicates from which ISL VLAN identifier 435 to start; all VLANs 106 which precede the start value 406 are not advertised. If the start value 406 is zero, all VLANs 106 are advertised.

Advertisements are authenticated; learning only occurs from authentic advertisements. Each advertisement comprises a checksum, preferably the MD5 digest value 412, which is computed using a one-way cryptographic hash function (the MD5 digest function) of the concatenation of (1) the Summary-Advert message 410 with the followers value 413 replaced with a zero value, (2) the VLAN blocks 430 ordered by ISL VLAN identifier 435, and (3) a "secret value". The default secret value is all zeros, thus providing non-secure but immediately compatible operation. The secret value may be configured for each LAN-switch 103 using the network administrative workstation 203, thus providing secure operation. Since each advertisement comprises a new configuration revision number 411, the MD5 digest value 412 cannot be repeated until the configuration revision number 411 is itself repeated.

The followers value 413 indicates how many Subset-Advert messages 420 follow the Summary-Advert message 410. The number of Subset-Advert messages 420 which follow the Summary-Advert message 410 are shown in table 4-2.

TABLE 4-2

| Reason for Sending Advertisement | Number of Followers |
|---|---|
| Neither this LAN-switch or any other LAN-switch has recently (within the timeout period) sent an advertisement. | zero |
| A configuration change has been made. | the minimun number required to contain all information on exactly those VLANs which have changed, ordered by ISL VLAN identifier |
| An Advert-Request message for information for all VLANs was received. | the minimum number required to contain all information on all VLANs, ordered by ISL VLAN identifier |
| An Advert-Request message for information about a subset of all VLANs was received. | the minimum number required to contain all information on all VLANs except those which were not requested, ordered by ISL VLAN identifier |

The VLAN type value 432 indicates what type the VLAN 106 is: ethernet or IEEE 802.3, token ring or IEEE 802.5, or FDDI.

The maximum frame size value 439 indicates the maximum frame size for that particular VLAN 106.

An Advert-Request message 400 is sent in the following cases:

- when the LAN-switch 103 is rebooted.
- when the LAN-switch 103 receives a Subset-Advert message 420 having a configuration revision number 411 higher than the LAN-switch's own configuration revision number 411.
- when the LAN-switch 103 receives a Summary-Advert message 410 having a configuration revision number 411 higher than the LAN-switch's own configuration revision number 411, and followed by zero Subset-Advert messages 420.
- when the LAN-switch 103 does not receive the expected number of Subset-Advert messages 420 within a short period after receiving a Summary-Advert message 410 having a configuration revision number 411 higher than the LAN-switch's own configuration revision number 411. In this case, the Advert-Request message 400 is set to request only the missing Subset-Advert messages 420, by setting the start value 406 to one more than the highest ISL VLAN identifier 435 received.
- when the LAN-switch 103 receives a Summary-Advert message 410 having a configuration revision number 411 more than one value higher than the LAN-switch's own configuration revision number 411.

An advertisement, comprising a Summary-Advert message 410 and zero or more Subset-Advert messages 420, is sent in the following cases:

- immediately after its configuration revision number is modified (thus, immediately after any configuration change);
- periodically on any trunk port 202 for which it has not sent an advertisement or received an advertisement matching its own, for a configurable timeout period, preferably about five minutes. The actual time for sending advertisements is jittred (modified by a small random or pseudorandom value) to avoid syncrhonization effects. Periodic advertisements can be disabled using the network administrative workstation 203.
- when a request for an advertisement is received. In this case, the timeout period is truncated to a small random or pseudorandom value.

In a preferred embodiment, the timeout for sending an advertisement is between about 2 minutes and about 10 minutes. Whenever this timeout is started, a pseudorandom value of less than about 1 second is added to it. When a consistent advertisement is received, the timeout is restarted without sending any advertisement. When an Advert-Request message 400 is received, the timeout is truncated to the value of the most recent pseudorandom value.

Those skilled in the art will recognize, after perusal of this application, that the VLAN trunk protocol may be used to distribute other and further types of information, that such activity would not require undue experimentation, and that such activity is within the scope and spirit of the invention. For example, such other and further types of information could include the following:

- port configuration information—whether a particular port 202 is a static port 202, dynamic port 202, or a trunk port 202; or
- dynamic assignment configuration information—either (1) which VLAN 106 a dynamic port 202 is associated with, or (2) a mapping between a layer three protocol address space, or a subspace thereof, and which VLAN 106 a dynamic port 202 should be associated with.

VCS Protocol

A VLAN configuration server comprises local information about VLANs 106, including port configuration information and dynamic assignment configuration information. In a preferred embodiment, the VLAN configuration server is available at the network work administrative workstation 203, but in alternative embodiments, may be a separate device 101 or may be distributed over several LAN-switches 103 or other devices 101.

To configure its ports 202, each LAN-switch 103 sends a message to the VCS to request configuration information. If the LAN-switch 103 is coupled to a ATM network 102, it also attempts, for each VLAN 106 it knows about, to join the LANE emulated-LAN (ELAN) having the same name.

For static ports 202, the LAN-switch 103 receives configuration information specifying with which VLAN 106 the port 202 is associated.

For dynamic ports 202, the LAN-switch 103 receives configuration information specifying a mapping to VLANs 106 for MAC addresses for the sending devices 101 for frames 104.

The message requesting configuration information is sent directly to the VCS if the LAN-switch 103 is not coupled to a ATM network 102. Otherwise, the message is encapsulated using the LANE protocol and sent to a LANE configuration server (LECS).

If the VCS (or LECS) responds for a port 202 with a VLAN name (or ELAN name) which is known to the LAN-switch 103, the port 202 is assigned to the VLAN 106 with that name.

If the VCS (or LECS) responds for a port 202 with a refusal, that port 202 is disabled.

If the VCS (or LECS) responds for a port 202 with a VLAN name (or ELAN name) which is not known to the LAN-switch 103, or if the VCS (or LECS) does not respond after a number of retries, or if the VCS (or LECS) cannot be reached, the LAN-switch 103 retries the request at periodic intervals.

However, if the LAN-switch 103 has local configuration information which maps a source MAC addresses to VLANs 106 for a dynamic port 202, it uses that local configuration information to reassign the dynamic port 202 in response to source MAC addresses.

Alternative Embodiments

Although preferred embodiments are disclosed herein, many variations are possible which remain within the concept:, scope, and spirit of the invention, and these variations would become clear to those skilled in the art after perusal of this application.

What is claimed is:

1. A multiple VLAN architecture system, in which multiple different VLANs are capable of operating within a single network, comprising at least one network communication medium;

a LAN-switch coupled to said at least one network communication medium and disposed to receive and route packets, each said packet having a VLAN identifier, and comprising means for routing from a first VLAN to a second VLAN, said means for routing comprising means for removing a first VLAN encapsulation and means for adding a second VLAN encapsulation, said means for adding said second VLAN encapsulation replacing said first VLAN encapsulation with said second VLAN encapsulation, said means for removing and said means for adding located at said LAN-switch; and means for identifying said VLAN identifier and means for determining a new VLAN identifier for said second VLAN responsive thereto.

2. A multiple VLAN architecture system, in which multiple different VLANs are capable of operating within a single network, comprising at least one network communication medium; and a LAN-switch coupled to said at least one network communication medium and disposed to receive and route packets, each said packet having a VLAN identifier, and comprising means for routing from a first VLAN to a second VLAN, said means for routing comprising means for removing a first VLAN encapsulation and means for adding a second VLAN encapsulation, said means for adding said second VLAN encapsulation replacing said first VLAN encapsulation with said second VLAN encapsulation, said means for removing and said means for adding located at said LAN-switch;

wherein said LAN-switch comprises a plurality of static ports, each said static port being associated with one of said VLANs.

3. A multiple VLAN architecture system, in which multiple different VLANs are capable of operating within a single network, comprising a plurality of network communication media;

a first VLAN comprising a first plurality of devices, each one of said first plurality of devices coupled to at least one of said network communication media; and a second VLAN comprising a second plurality of devices, each one of said second plurality of devices coupled to at least one of said network communication media;

said first plurality of devices and said second plurality of devices sharing at least one common device; and said system further comprising:

means for receiving a packet having a first encapsulation according to said first VLAN;

means for removing said first encapsulation;

means for re-encapsulating said packet with a second encapsulation according to said second VLAN; and means for receiving a packet from a source coupled to said first VLAN and transmitting said packet to a destination coupled to said second VLAN;

wherein said first encapsulation and said second encapsulation are substantially different, and said means for removing and said means for re-encapsulating are located at said at least one common device.

4. A multiple VLAN architecture system, in which multiple different VLANs are capable of operating within a single network, comprising a plurality of network communication media;

a first VLAN comprising a first plurality of devices, each one of said first plurality of devices coupled to at least one of said network communication media; and a second VLAN comprising a second plurality of devices, each one of said second plurality of devices coupled to at least one of said network communication media;

said first plurality of devices and said second plurality of devices sharing at least one common device; and said system further comprising:

means for receiving a packet having a first encapsulation according to said first VLAN;

means for removing said first encapsulation;

means for re-encapsulating said packet with a second encapsulation according to said second VLAN; and means for defining a new VLAN comprising a new corresponding plurality of devices, each one of said new corresponding plurality of devices coupled to at least one of said network communication media;

wherein said first encapsulation and said second encapsulation are substantially different, and said means for removing and said means for re-encapsulating are located at said at least one common device.

5. A method for routing a packet in a multiple VLAN architecture system, in which multiple different VLANs are capable of operating within a single network having at least one network communication medium, said system including a LAN-switch coupled to said at least one network communication medium and disposed to receive and route said packet, said packet having a VLAN identifier, said LAN-switch performing the step of:

routing said packet from a first VLAN to a second VLAN by:

removing a first VLAN encapsulation; and replacing said first VLAN encapsulation with a second VLAN encapsulation;

wherein said LAN-switch includes a plurality of ports; and wherein said plurality of ports include at least one dynamic port, and said method further includes steps of:

associating said at least one dynamic port with a first one of said VLANs; and reassociating said at least one dynamic port with a second one of said VLANs.

6. A method for routing a packet in a multiple VLAN architecture system, in which multiple different VLANs are capable of operating within a single network having a plurality of network communication media, said system including a first VLAN comprising a first plurality of devices and a second VLAN comprising a second plurality of devices, each one of said second plurality of devices coupled to at least one of said network communication media, said first plurality of devices and said second plurality of devices sharing at least one common device, said at least one common device performing the steps of:

receiving a packet having a first encapsulation according to said first VLAN;

removing said first encapsulation;

re-encapsulating said packet with a second encapsulation according to said second VLAN, wherein said first encapsulation and said second encapsulation are substantially different; and defining a new VLAN comprising a new corresponding plurality of devices, each one of said new corresponding plurality of devices coupled to at least one of said network communication media.

7. An apparatus having a central processing unit (CPU) and a memory coupled to said CPU for switching a packet between a plurality of different VLAN segments operational within a single network having one or more VLANs and one or more management domains, each management domain for management of at least one VLAN, the apparatus including:

a network interface in communication with at least one network communication medium and with said CPU;

a packet reception mechanism configured to receive said packet from said at least one network communication medium using the network interface, said packet having a VLAN identifier and originating from a first VLAN segment;

a packet routing mechanism configured to route said packet to a second VLAN segment; and a VLAN configuration mechanism configured to maintain said one or more management domains in said apparatus, wherein the VLAN configuration mechanism includes:

a case detection mechanism configured to detect when to request an advertisement message;

a request advertisement mechanism, responsive to the case detection mechanism, configured to send an advert-request message over said at least one network communication medium;

an advertisement reception mechanism configured to receive said advertisement message from said at least one network communication medium; and a configuration maintenance mechanism, responsive to changes in said one or more management domains, configured to maintain a configuration revision number for each of said one or more management domains.

8. The apparatus of claim 7 wherein said advert-request message includes:

an advert-request identification value in a type of message field; and a management domain identification value of said apparatus in a management domain field.

9. The apparatus of claim 8 wherein said advert-request message further includes: a start field containing a VLAN selection value that controls which of said one or more VLANS respond to said advert-request message.

10. The apparatus of claim 7 wherein the case detection mechanism is responsive to a condition selected from the group consisting of:

a condition of the apparatus initializing;

a condition of the apparatus having received one of a set of advertisement subset messages having a configuration value higher than said configuration revision number;

a condition of the apparatus having received an advertisement summary message having a configuration value higher than said configuration revision number without a subsequent one of a set of advertisement subset messages;

a condition of the apparatus having not received each of a set of advertisement subset messages as specified by an advertisement summary message; or a condition of the apparatus having received an advertisement summary message having a configuration value more than one higher than said configuration revision number.

11. The apparatus of claim 7 wherein said advertisement message includes:

an advertisement summary message; and a set of advertisement subset messages;

wherein each message has a type of message field and a type of message field.

12. The apparatus of claim 11 wherein said advertisement summary message includes:

an advertisement summary message identification value, in said type of message field, that identifies said advertisement summary message;

a management domain identification value of a source of said advertisement summary message in said management domain field;

a followers value, in a followers field, that specifies a number of said set of advertisement subset messages related to said advertisement summary message; and a configuration value, in a configuration revision number field, that identifies a configuration state for the source of said advertisement summary message.

13. The apparatus of claim 11 wherein each of said set of advertisement subset messages includes:

an advertisement subset message identification value, in said type of message field, that identifies said advertisement subset message;

a configuration value, in a configuration revision number field, that identifies the configuration state for a source of the advertisement subset message;

a sequence value, in a sequence number field, that distinguishes each of said set of advertisement subset messages; and a set of VLAN block specific information for the VLANs advertised by the source of said advertisement subset messages.

14. An apparatus having a central processing unit (CPU) and a memory coupled to said CPU for switching a packet between a plurality of different VLAN segments operational within a single network having one or more VLANs and one or more management domains, each management domain for management of at least one VLAN, the apparatus including:

a network interface in communication with at least one network communication medium and with said CPU;

a packet reception mechanism configured to receive said packet from said at least one network communication medium using the network interface, said packet having a VLAN identifier and originating from a first VLAN segment;

a packet routing mechanism configured to route said packet to a second VLAN segment; and a VLAN configuration mechanism configured to maintain said one or more management domains in said apparatus, wherein the VLAN configuration mechanism includes:

a case detection mechanism configured to detect when to send an advertisement message;

a send advertisement sending mechanism, responsive to the case detection mechanism, configured to send an advertisement message over said at least one network communication medium;

an advert-request message reception mechanism configured to receive an advert-request message from said at least one network communication medium; and a configuration maintenance mechanism, responsive to changes in said one or more management domains, configured to maintain a configuration revision number for each of said one or more management domains.

15. The apparatus of claim 14 wherein the case detection mechanism is responsive to a condition selected from the group consisting of:

a condition of the apparatus having modified said configuration revision number;

a condition of an expiration of a timer without the apparatus having sent said advertisement message or the apparatus having received another advertisement message from said at least one network communication medium; or a condition of receipt of said advert-request message by the advert-request message reception mechanism.

16. A computer program product including:

a computer usable storage medium having computer readable code embodied therein for causing a computer to switch a packet between a plurality of different VLAN segments operational within a single network having one or more VLANs and one or more management domains, each management domain for management of at least one VLAN, said computer readable code including:

computer readable program code configured to cause said computer to effect a network interface in communication with at least one network communication medium and with said CPU;

computer readable program code configured to cause said computer to effect a packet reception mechanism configured to receive said packet from said at least one network communication medium using the network interface, said packet having a VLAN identifier and originating from a first VLAN segment;

computer readable program code configured to cause said computer to effect a packet routing mechanism configured to route said packet to a second VLAN segment; and computer readable program code configured to cause said computer to effect a VLAN configuration mechanism configured to maintain said one or more management domains in said product, wherein the VLAN configuration mechanism includes:

computer readable program code configured to cause said computer to effect a case detection mechanism configure to detect when to request an advertisement message;

computer readable program code configured to cause said computer to effect a request advertisement mechanism, responsive to the case detection mechanism, configured to send an advert-request message over said at least one network communication medium;

computer readable program code configure to cause said computer to effect an advertisement reception mechanism configured to receive said advertisement message from said at least one network communication medium; and computer readable program code configured to cause said computer to effect a configuration maintenance mechanism, responsive to changes in said one or more management domains, configured to maintain a configuration revision number for each of said one or more management domains.

17. The product of claim 16 wherein the case detection mechanism is responsive to a condition selected from the group consisting of:

a condition of the product initializing;

a condition of the product having received one of a set of advertisement subset messages having a configuration value higher than said configuration revision number;

a condition of the product having received an advertisement summary message having a configuration value higher than said configuration revision number without a subsequent one of a set of advertisement subset messages;

a condition of the product having not received each of a set of advertisement subset messages as specified by an advertisement summary message; or a condition of the product having received an advertisement summary message having a configuration value more than one higher than said configuration revision number.

18. A computer program product including:

a computer usable storage medium having computer readable code embodied therein for causing a computer to switch a packet between a plurality of different VLAN segments operational within a single network having one or more VLANs and one or more management domains, each management domain for management of at least one VLAN, said computer readable code including:

computer readable program code configured to cause said computer to effect a network interface in communication with at least one network communication medium and with said CPU;

computer readable program code configured to cause said computer to effect a packet reception mechanism configured to receive said packet from said at least one network communication medium using the network interface, said packet having a VLAN identifier and originating from a first VLAN segment;

computer readable program code configured to cause said computer to effect a packet routing mechanism configured to route said packet to a second VLAN segment; and computer readable program code configured to cause said computer to effect a VLAN configuration mechanism configured to maintain said one or more management domains in said product, wherein the VLAN configuration mechanism includes:

computer readable program code configured to cause said computer to effect a case detection mechanism configured to detect when to send an advertisement message;

computer readable program code configured to cause said computer to effect a send advertisement sending mechanism, responsive to the case detection mechanism, configured to send an advertisement message over said at least one network communication medium;

computer readable program code configured to cause said computer to effect an advert-request message reception mechanism configured to receive an advert-request message from said at least one communication medium; and computer readable program code configured to cause said computer to effect a configuration maintenance mechanism, responsive to changes in said one or more management domains, configured to maintain a configuration revision number for each of said one or more management domains.

19. The product of claim 18 wherein the case detection mechanism is responsive to a condition selected from the group consisting of:

a condition of the product having modified said configuration revision number;

a condition of an expiration of a timer without the product having sent said advertisement message or the product having received another advertisement message from said at least one network communication medium; or a condition of receipt of said advert-request message by the advert-request message reception mechanism.

20. A multiple VLAN architecture in which multiple different VLANs are capable of operating within a single network, comprising at least one network communication medium; and a LAN-switch coupled to said at least one network communication medium and disposed to receive and route packets, each said packet having a VLAN identifier, and comprising means for routing from a first VLAN to a second VLAN, said means for routing comprising means for removing a first VLAN encapsulation and means for adding a second VLAN encapsulation, said means for adding said second VLAN encapsulation replacing said first VLAN encapsulation with said second VLAN encapsulation, said means for removing and said means for adding located at said LAN-switch;

wherein said LAN-switch comprises a plurality of ports; and wherein said plurality of ports include at least one dynamic port which is associated with a first one of said VLANs and includes means for being reassociated with a second one of said VLANs.

* * * * *